D. D. CORNING.
GAS LIGHTING SYSTEM.
APPLICATION FILED MAR. 23, 1915.
1,177,386.
Patented Mar. 28, 1916.
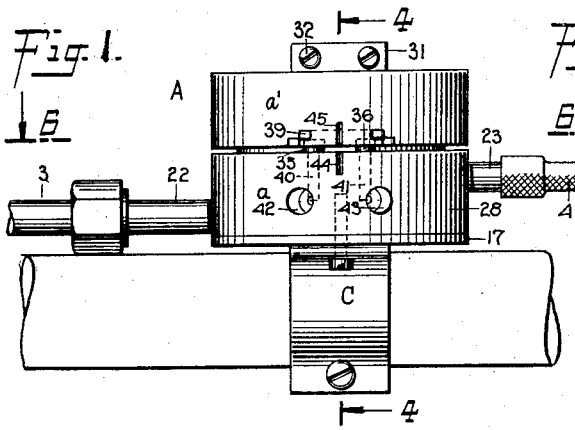
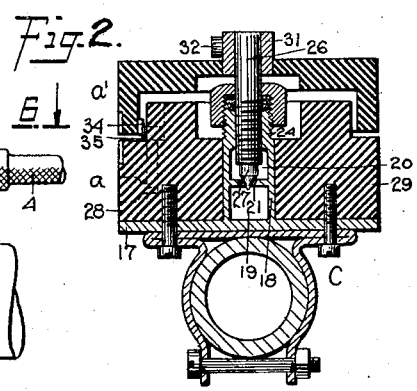
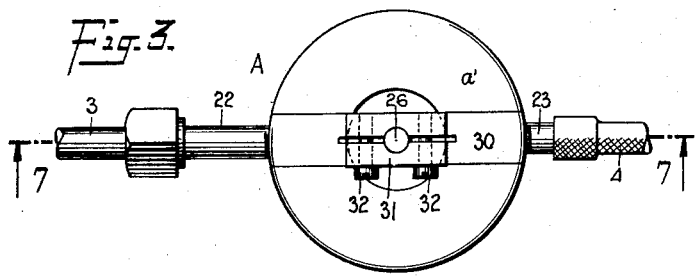
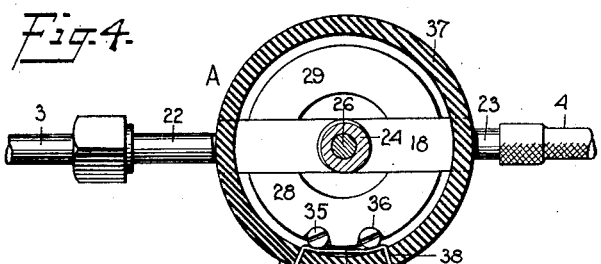
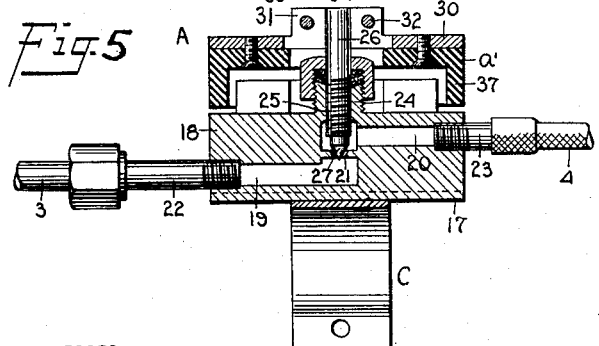
WITNESSES
George L. Blume.
INVENTOR
Duard D. Corning
BY
ATTORNEYS

UNITED STATES PATENT OFFICE.

DUARD DUANE CORNING, OF CEDAR FALLS, IOWA.

GAS-LIGHTING SYSTEM.

1,177,386.   Specification of Letters Patent.   Patented Mar. 28, 1916.

Application filed March 23, 1915. Serial No. 16,520.

*To all whom it may concern:*

Be it known that I, DUARD D. CORNING, a citizen of the United States, and a resident of Cedar Falls, in the county of Blackhawk and State of Iowa, have invented a new and Improved Gas-Lighting System, of which the following is a full, clear, and exact description.

This invention relates to gas lighting systems especially adapted for motor cycle, automobile and other lamps, although it is not necessarily limited to this use, and the invention has to deal more particularly with a combined valve and switch whereby the opening of the valve of the gas conduit is accompanied by the closing of the ignition circuit, so that igniting sparks will be produced at the burner or burners to ignite the gas flowing from the orifices thereof, and after the burners are lighted the ignition circuit will of course be opened.

The invention has for its general objects to improve and simplify the construction of a combined gas valve and circuit switch so as to be reliable and efficient in use, comparatively simple and inexpensive to manufacture, and so designed that the turning on and off of the gas and opening and closing of the ignition circuit can be easily accomplished.

A further object of the invention is the provision of a device of the character referred to having a valve and circuit switch combined in a single structure formed with a rotatable part which is fastened to the valve stem and which also carries the movable contact of the switch, whereby the turning of the said element effects the simultaneous opening of the gas supply and closing of the ignition circuit, and furthermore, the device is provided with a clip or equivalent means whereby it may be fastened in position on a motor cycle frame or other support.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is an enlarged side view of the valve and switch; Fig. 2 is a vertical section on the line 4—4, Fig. 1; Fig. 3 is a plan view of the valve and switch; Fig. 4 is a horizontal section on the line 6—6, Fig. 1; Fig. 5 is a vertical section on the line 7—7, Fig. 3.

The combined valve and switch device A is made of a fixed base section $a$, and a movable cap section $a'$, and on the bottom of the base section $a$ is fastened a clip C, whereby the device A is fastened to the frame of the motor cycle, preferably at a point conveniently within reach of the driver. The base section $a$ embodies a bottom plate 17 having a diametrical body portion 18 that has passages 19 and 20 connected by a valve port 21 at the center of the body 18. The passages 19 and 20 have nipples 22 and 23 to which the pipes 3 and 4 are respectively connected, said device being connected with a gas tank and lamp respectively. Rising from the center of the body 18 is an internally threaded boss 24 which has a threaded bore 25 with which engages the threaded stem 26 of the needle valve 27. This valve 27 coöperates with the valve port 21 so as to open or close the supply of gas to the lamp from the gas tank. By turning the stem 26 the valve 27 is opened or closed, and to facilitate the turning of the stem the cap section $a'$ is fastened to the upper end of the stem. Approximately semi-circular blocks 28 and 29 are fastened to the bottom plate 17, and disposed at opposite sides of the body 18 so that the base section $a$ is of circular form, as is also the cap section $a'$, the upper part of the base section being reduced so that the cap section embraces the same, as shown in Figs. 2 and 5. The cap section $a'$ has fastened thereto a diametrical strip of metal 30 formed with a split hub portion 31 into which the upper end of the stem 26 extends, and by means of clamping screws 32 the hub 31 is rigidly connected with the valve stem. A packing box 33 of suitable construction surrounds the valve stem to prevent leakage of gas, the stuffing-box being housed between the two sections $a$ and $a'$ of the device.

The ignition circuit is adapted to be opened and closed by the turning of the cap section $a'$, and for this purpose the latter has a contact 34 which is adapted to engage fixed contacts 35 and 36 carried by the base section $a$, and to which contacts the wires 7 and 8 are respectively connected. The movable contact 34 is a strip of flexible or spring metal attached to the inner surface of the flange 37 of the cap section $a'$, the ends of the metal strip forming the contact 34 being disposed in radial slots 38, and the projecting ends of the strip are bent backwardly as shown at 39, Fig. 4. The contacts 35 and 36 are formed by the heads of screws 40 and 41 which are threaded in the block of insulation 28, which block has apertures 42 and 43 for receiving the ends of the wires of the ignition circuit, and after these wires are inserted the screws 40 and 41 are tightened so as to firmly connect the wires with the combined valve and switch. The movable contact 34 is so related to the valve 27 that when the valve is closed the contact 34 will be out of circuit-closing relation to the contacts 35 and 36, but when it is desired to light the lamp it is merely necessary to turn the cap $a'$ in the only direction in which it will turn, whereby the valve stem unscrews and opens the valve port 21, so that gas will flow to the lamp. By the time the gas reaches the lamp the movable contact 34 will engage the contacts 35 and 36 and thereby close the ignition circuit so that a spark will be produced at the burner and ignite the gas. When the gas is ignited the cap section of the device A will be turned far enough to open the circuit by moving the contact 34 out of engagement with either of the contacts 35 or 36. Marks 44 and 45 may be arranged on the base and cap sections $a$ and $a'$, and when these register it will indicate that the valve is open to the proper extent, and the ignition circuit will be opened by the contact 34 being out of engagement with both contacts 35 and 36.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A combined valve and switch comprising a body containing a fluid passage having a port, a cap having rigidly fastened thereto a stem threaded into the body and forming a valve for opening and closing the port, said body having apertures, circuit wires extending into the apertures and clamped in position by screws having their heads projecting from the body, and a spring contact having both ends fastened to the cap and its intermediate portion unsupported and free to yield, the spring contact being located to simultaneously engage the heads of both screws by the relative turning of the body and cap.

2. A device of the class described comprising a body having openings, circuit wires extending into the openings, screws clamping the circuit wires in the body with the heads of the screws projecting, a rotatable element mounted on the body, and a spring strip arranged to form a bridging contact engageable with the heads of the screws, the ends of the strip being fastened in recesses in the said element, with the intermediate portion of the strip spaced from the elements for yielding when engagement with the heads of the screws is effected.

In testimony whereof I have signed my name to this specification in the presence of two subscribing witnesses.

DUARD DUANE CORNING.

Witnesses:
H. B. TURNIPSEED,
LE CLAIR MARTIN.

Copies of this patent may be obtained for five cents each, by addressing the "Commissioner of Patents, Washington, D. C."